US009656396B2

(12) United States Patent
Miyazaki (10) Patent No.: US 9,656,396 B2
(45) Date of Patent: May 23, 2017

(54) ANNULAR SPRING AND ROBOT JOINT MECHANISM USING THE SAME

(71) Applicant: HONDA MOTOR CO., LTD., Tokyo (JP)

(72) Inventor: Susumu Miyazaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 195 days.

(21) Appl. No.: 14/790,839

(22) Filed: Jul. 2, 2015

(65) Prior Publication Data

US 2016/0107322 A1   Apr. 21, 2016

(30) Foreign Application Priority Data

Oct. 17, 2014  (JP) ................. 2014-212507

(51) Int. Cl.
| | |
|---|---|
| F16H 25/06 | (2006.01) |
| F16H 25/04 | (2006.01) |
| B25J 19/00 | (2006.01) |
| F16D 3/64 | (2006.01) |
| B25J 9/10 | (2006.01) |
| F16D 3/12 | (2006.01) |

(52) U.S. Cl.
CPC ......... *B25J 19/0091* (2013.01); *B25J 9/1025* (2013.01); *F16D 3/64* (2013.01); *F16D 3/12* (2013.01); *Y10S 901/25* (2013.01); *Y10S 901/49* (2013.01)

(58) Field of Classification Search
CPC ..... F16H 25/06; F16H 2025/06; F16H 49/001
USPC ....................................... 74/640, 63
See application file for complete search history.

(56) References Cited

U.S. PATENT DOCUMENTS

| | | | | |
|---|---|---|---|---|
| 6,616,241 | B1 * | 9/2003 | Masuda ............... | B60N 2/2227 297/361.1 |
| 7,673,702 | B2 * | 3/2010 | Johnson ................. | B25B 21/00 173/109 |
| 8,866,643 | B2 * | 10/2014 | Sano ........................ | G05G 1/08 340/542 |
| 9,322,395 | B2 * | 4/2016 | Fujiwara .................. | F16D 7/10 |

FOREIGN PATENT DOCUMENTS

| | | |
|---|---|---|
| JP | 2008-055541 | 3/2008 |
| JP | 4801534 | 8/2011 |

* cited by examiner

*Primary Examiner* — Ha D Ho
(74) *Attorney, Agent, or Firm* — Rankin, Hill & Clark LLP (57) ABSTRACT

On an inner peripheral surface of an outer peripheral member 10, a recess 11 is formed to which a pipe spring 30 is fitted. On an outer peripheral surface of an inner peripheral member 20 arranged concentrically with and rotatable relatively to the outer peripheral member 10 on an inner peripheral side of the outer peripheral member 10, a cam surface 21 is formed which abuts against the pipe spring 30. The cam surface 21 protrudes in the radial direction as it is farther away in the circumferential direction of the outer peripheral member 10 from the point of contact with the pipe spring 30 in the state where no load is applied.

7 Claims, 6 Drawing Sheets

ANNULAR SPRING AND ROBOT JOINT MECHANISM USING THE SAME

BACKGROUND OF THE INVENTION

Field of the Invention

The present invention relates to an annular spring which transmits a rotary driving force transmitted to one of an inner peripheral member and an outer peripheral member to the other, and a robot joint mechanism using the same.

Description of the Related Art

There is conventionally known a robot which includes, similarly to a human being, a body corresponding to a torso, a head disposed on top of the body, right and left arms extended from respective sides of the upper portion of the body, a hand provided at the tip end of each arm, right and left legs extended downward from the lower portion of the body, and a foot attached to the tip end of each leg. This kind of robot is capable of bending and stretching the arms and legs at joint mechanisms corresponding to the human shoulder joints, elbow joints, wrist joints, hip joints, knee joints, and ankle joints or the like.

As the joint mechanism, there is one which includes a driving source such as an actuator, an annular spring to which a driving force is transmitted from a speed reduction mechanism, and a link mechanism which receives the driving force transmitted from the annular spring and bends or stretches the corresponding part of the robot.

Some of the annular springs include an annular outer peripheral member, an annular inner peripheral member disposed on the inner peripheral side of the outer peripheral member, and an elastic member arranged between the outer peripheral member and the inner peripheral member, the elastic member being formed integrally with the outer and inner peripheral members. Examples of the elastic member of the annular spring include those of a cantilever type and a torsion bar type, which produce bending stress and torsional stress, respectively, when load is applied thereto as the outer and inner peripheral members rotate relatively to each other (see, for example, Patent Literature 1).

With the joint mechanism equipped with the annular spring, when a bent or stretched arm or leg contacts or collides with an obstacle or the like, the elastic member of the annular spring absorbs the impact of the collision, to protect the joint mechanism.

PRIOR ART LITERATURE

Patent Literature

[Patent Literature 1] Japanese Patent No. 4801534

SUMMARY OF THE INVENTION

In the conventional annular spring, however, the member producing bending stress or torsional stress when load is applied is used as the elastic member. Therefore, in order to assure sufficiently low rigidity as well as a sufficiently large amount of displacement in the relative rotational direction of the outer and inner peripheral members for absorbing the impact, it is necessary to increase the axial length and/or the radius, making it difficult to reduce the size and/or weight.

Further, in the conventional annular spring, the relative positions of the outer and inner peripheral members are shifted (i.e., there occurs deviation of the central axis) when receiving an impact. Thus, in order to suppress such deviation of the central axis, a bearing needs to be used together with the annular spring. This means that in the robot joint mechanism using the conventional annular spring, it is necessary to secure a space for disposing the bearing therein, also making it difficult to reduce the size and/or weight.

The present invention has been made in view of the above-described problems, and it is an object of the present invention to provide a compact and light-weight annular spring which can readily absorb an impact and suffers less deviation of the central axis, and a robot joint mechanism using the annular spring.

In order to achieve the above object, an annular spring of the present invention includes an annular outer peripheral member, an annular inner peripheral member arranged concentrically with the outer peripheral member on an inner peripheral side of the outer peripheral member and rotatable relatively to the outer peripheral member, and an elastic member arranged between the outer peripheral member and the inner peripheral member, wherein the elastic member is composed of an elastic body having a circular cross section, one of an inner peripheral surface of the outer peripheral member and an outer peripheral surface of the inner peripheral member has formed thereon a recess to which the elastic member is fitted, the other of the inner peripheral surface and the outer peripheral surface has formed thereon a cam surface against which the elastic member abuts, and the cam surface is formed in such a way as to protrude in a radial direction as it is farther away in a circumferential direction of the outer peripheral member or the inner peripheral member from a point of contact with the elastic member in a state where the outer peripheral member and the inner peripheral member are not rotating relatively to each other.

In the annular spring of the present invention, when the outer peripheral member and the inner peripheral member rotate relatively to each other and apply load to the elastic member, the elastic member is elastically deformed as being compressed by the cam surface. When the load is no longer applied, the cam surface is pressed by the elastic force of the elastic member, so the relative positions of the outer peripheral member and the inner peripheral member return to the state before the application of the load.

That is, the annular spring of the present invention is configured such that compressive stress is produced in the elastic member. Therefore, even if the rigidity is lowered and the amount of displacement in the relative rotational direction of the outer and inner peripheral members is increased so as to make it easier to absorb an impact, the axial length and/or the radius can be decreased and the weight can also be reduced as compared to the conventional annular spring.

Further, the characteristics of the annular spring of the present invention are determined by the shape of the cam surface, besides the elastic force of the elastic member. The cam surface is formed on the inner peripheral surface of the outer peripheral member or the outer peripheral surface of the inner peripheral member, so it can be easily worked. Accordingly, it is readily possible to obtain arbitrary characteristics for the annular spring of the present invention, with a high degree of freedom in design.

Further, the space between the outer peripheral member and the inner peripheral member in the annular spring of the present invention only needs to be able to accommodate the portion of the elastic member protruding from the recess. It is thus possible to narrow the space as compared to the conventional annular spring. Consequently, it is possible to increase the inner diameter of the annular spring or decrease the outer diameter thereof, as compared to the conventional annular spring.

Sill further, the elastic member functions like a rolling element, and the annular spring serves as a bearing as a whole. It is thus possible to suppress shifting of the relative positions of the outer peripheral member and the inner peripheral member (i.e. the deviation of the central axis). Accordingly, in the case where the annular spring of the present invention is used to form a mechanical device, the bearing for holding the annular spring can be omitted, so it is readily possible to reduce the size and weight of the device.

The annular spring of the present invention preferably includes a rolling element between the outer peripheral surface and the inner peripheral surface. Further, in the annular spring of the present invention, the elastic member is preferably rotatable inside the recess in which the elastic member is fitted.

With this configuration, the friction between the elastic member and the cam surface and the friction between the outer peripheral member and the inner peripheral member are alleviated, so the amount of displacement in the relative rotational direction of the outer peripheral member and the inner peripheral member can further be increased, and the performance as the bearing of the annular spring can also further be improved.

In the annular spring of the present invention, it is preferable that the elastic member fitted in the recess has a central axis which becomes farther away from the cam surface as compared to the inner peripheral surface or the outer peripheral surface on which the recess is formed.

With this configuration, even in the case where the elastic member is enlarged in design so as to transform the characteristics of the annular spring, an increase of the space between the outer peripheral member and the inner peripheral member can be prevented. It is thus possible to further suppress the deviation of the central axis to be small.

In the annular spring of the present invention, it is preferable that the recess has edges chamfered into an arc shape.

With this configuration, even when the elastic member is elastically deformed and applies a force attempting to spread out the recess and, thus, stress is produced in the recess, the stress is less likely to concentrate on the edges. Further, as the edge of the recess coming into contact with the elastic member is a curved surface, the contact area increases, preventing concentration of load on one point on the peripheral surface of the elastic member. As a result, the edge and the peripheral surface of the elastic member coming into contact therewith are less likely to be damaged.

In order to achieve the above object, a robot joint mechanism of the present invention includes any of the above-described annular springs, a driving source, and a speed reduction mechanism configured to decelerate a driving force from the driving source and transmit the resultant force to the outer peripheral member or the inner peripheral member of the annular spring.

The robot joint mechanism of the present invention configured as described above becomes smaller in size, lighter in weight, and easier to absorb an impact, as compared to the robot joint mechanism using the conventional annular spring.

In the robot joint mechanism of the present invention, the speed reduction mechanism may be a wave gear device including a circular spline having teeth formed on an inner peripheral surface and a flex spline having teeth, to be engaged with the teeth of the circular spline, formed on an outer peripheral surface, and the teeth of the circular spline may be arranged on the inner peripheral member of the annular spring.

DESCRIPTION OF THE PREFERRED EMBODIMENTS

First Embodiment

First, the configuration of an annular spring 1 according to a first embodiment will be described with reference to FIGS. 1 to 3.

Figure 1:
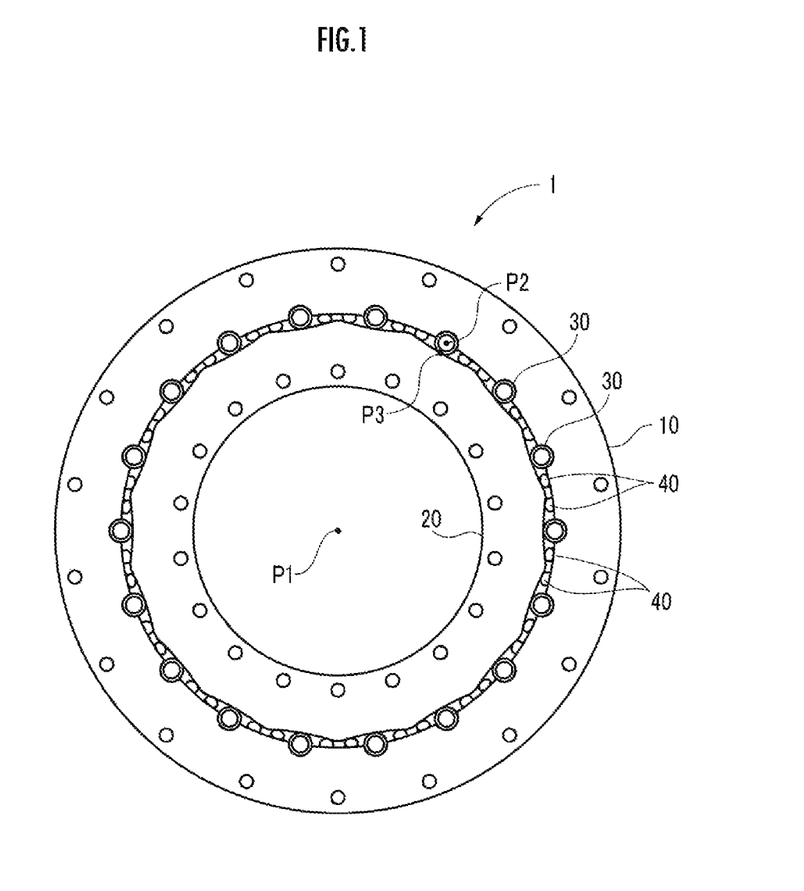
FIG. 1 is a plan view of an annular spring according to a first embodiment of the present invention.

As shown in FIG. 1, the annular spring 1 of the present embodiment includes an annular outer peripheral member 10, an annular inner peripheral member 20 arranged on an inner peripheral side of the outer peripheral member 10 concentrically with and rotatable relatively to the outer peripheral member 10, a plurality of pipe springs 30 (elastic members) arranged between the outer peripheral member 10 and the inner peripheral member 20, and a cross roller bearing 40 arranged between the outer peripheral member 10 and the inner peripheral member 20, and between the pipe springs 30.

Figure 2:
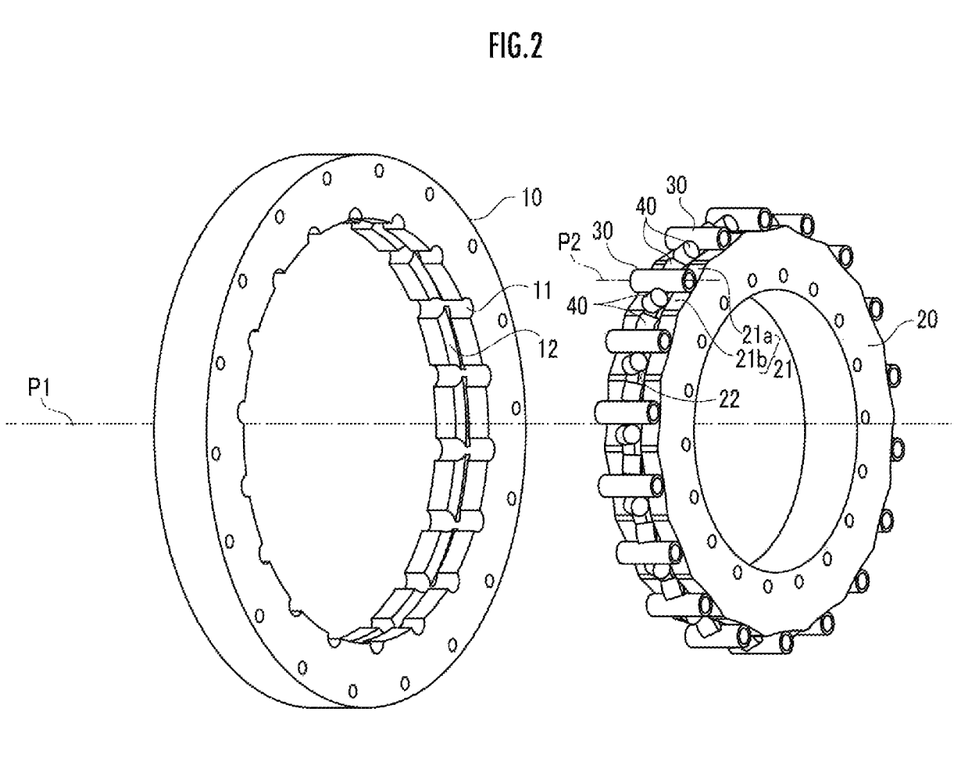
FIG. 2 is an exploded perspective view of the annular spring in FIG. 1.

As shown in FIG. 2, on an inner peripheral surface of the outer peripheral member 10, a plurality of recesses 11, into which the pipe springs 30 are rotatably fitted, and an outer peripheral side bearing groove 12 are formed. The outer peripheral member 10 has a central axis P1 which is in parallel with a central axis P2 of each pipe spring 30 fitted in the corresponding recess 11.

On an outer peripheral surface of the inner peripheral member 20, a plurality of cam surfaces 21, formed so as to abut against the pipe springs 30, and an inner peripheral side bearing groove 22 are formed.

Figure 3:
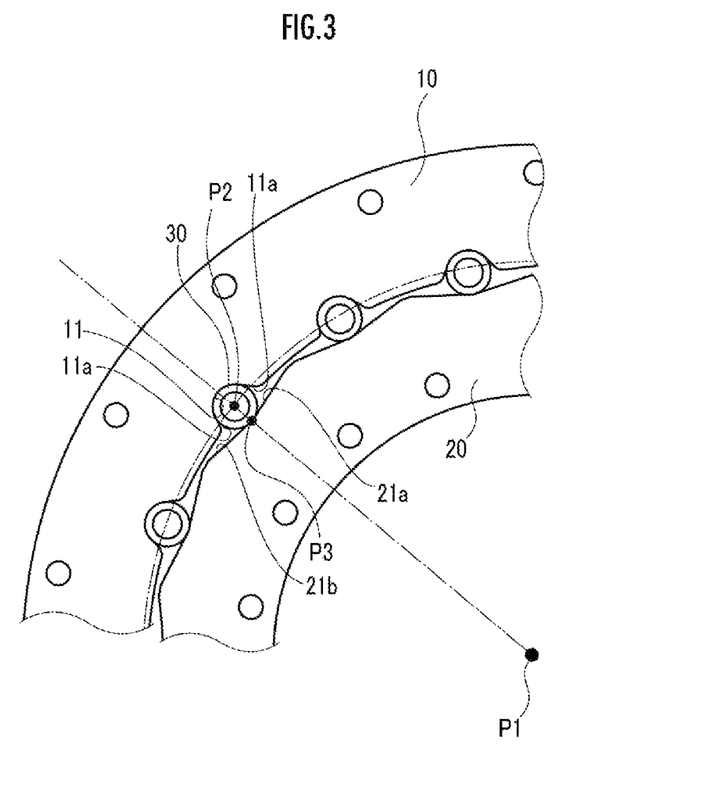
FIG. 3 is an enlarged plan view of the major part of the annular spring in FIG. 1.

As shown in FIG. 3, each recess 11 of the outer peripheral member 10 has its edges 11a chamfered into an arc shape. Thus, even when the pipe spring 30 is elastically deformed (see FIG. 4B) and applies a force attempting to spread out the recess 11, stress is less likely to concentrate on the edges 11a.

Further, as the edges 11a are chamfered (i.e. as the edges 11a are curved), as compared to the case where they are not chamfered, the contact area between the pipe spring 30 and the edge 11a increases, preventing concentration of load on one point on the peripheral surface of the pipe spring 30.

As a result, the edge 11a and the peripheral surface of the pipe spring 30 coming into contact therewith are less likely to be damaged.

The central axis P2 of the pipe spring 30 is located farther away from the cam surface 21 with which the pipe spring 30 comes in contact, as compared to the inner peripheral surface of the outer peripheral member 10 on which the recess 11 to which the pipe spring 30 is fitted is formed. More specifically, a circle (indicated by the dot-and-dash line in FIG. 3) formed by connecting the central axes P2 of the pipe springs 30 has a radius greater than the inner radius of the outer peripheral member 10.

With this configuration, in the annular spring 1, the space between the outer peripheral member 10 and the inner peripheral member 20 is considerably narrow as compared to the conventional annular spring. As a result, in the annular spring 1, shifting of the relative position of the inner peripheral member 20 with respect to the outer peripheral member 10 (i.e. the deviation of the central axis P1) is suppressed as compared to the conventional annular spring.

The cam surface 21 formed on the outer peripheral surface of the inner peripheral member 20 is made up of a first cam surface 21a and a second cam surface 21b corresponding to the first cam surface 21a.

The first cam surface 21a is formed in such a way as to protrude in a radial direction as it is farther away in the circumferential direction of the outer peripheral member 10 or the inner peripheral member 20 from the point of contact with the pipe spring 30 in the state where the outer peripheral member 10 and the inner peripheral member 20 are not rotating relatively to each other.

The second cam surface 21b is formed such that it is in line symmetry with the first cam surface 21a with respect to the line that passes the central axis P1 of the outer peripheral member 10 and a contact point P3 between the pipe spring 30 and the outer peripheral surface of the inner peripheral member 20 in the state where no load is applied.

The pipe spring 30 is configured to be rotatable about its central axis P2 in the interior of the recess 11 on the outer peripheral member 10. Between the outer peripheral member 10 and the inner peripheral member 20, the cross roller bearing 40 is arranged so as to be fitted into the outer peripheral side bearing groove 12 and the inner peripheral side bearing groove 22 (see FIG. 2).

With the rotatably arranged pipe springs 30 and the arrangement of the cross roller bearing 40, the friction between the pipe springs 30 and the cam surfaces 21 and the friction between the outer peripheral member 10 and the inner peripheral member 20 are alleviated in the annular spring 1, so the amount of displacement in the relative rotational direction of the outer peripheral member 10 and the inner peripheral member 20 is increased, and the performance as the bearing is improved.

A description will now be made, with reference to FIGS. 4A and 4B, about the case where a force causing the outer peripheral member 10 and the inner peripheral member 20 to rotate relatively to each other is applied to the annular spring 1 of the present embodiment.

Figure 4A:
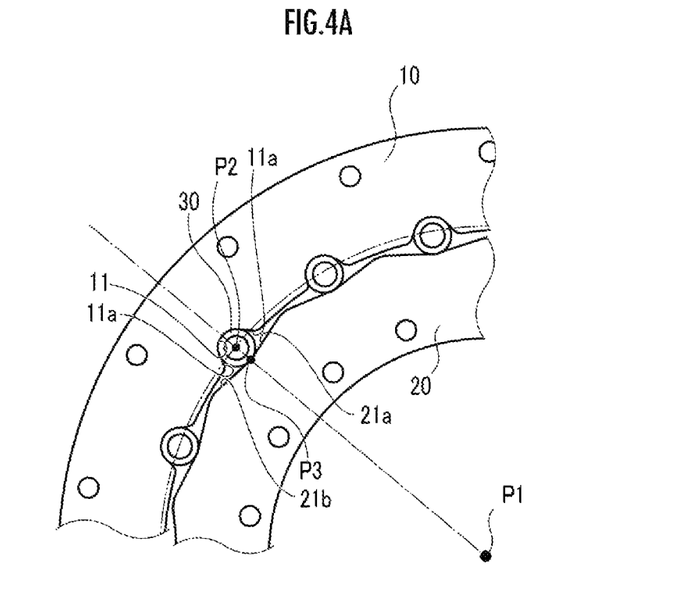
FIGS. 4A and 4B are schematic diagrams illustrating the state at the time of deformation of the annular spring in FIG. 1, FIG. 4A showing the state where no load is applied, FIG. 4B showing the state where load is applied.

As shown in FIG. 4A, in the case where no force causing the outer peripheral member 10 and the inner peripheral member 20 to rotate relatively to each other is being applied to the annular spring 1, each pipe spring 30 is not elastically deformed and comes into contact with the outer peripheral surface of the inner peripheral member 20 at a position (contact point P3) that is closest to the central axis P1 on the cam surface 21 of the inner peripheral member 20.

Figure 4B:
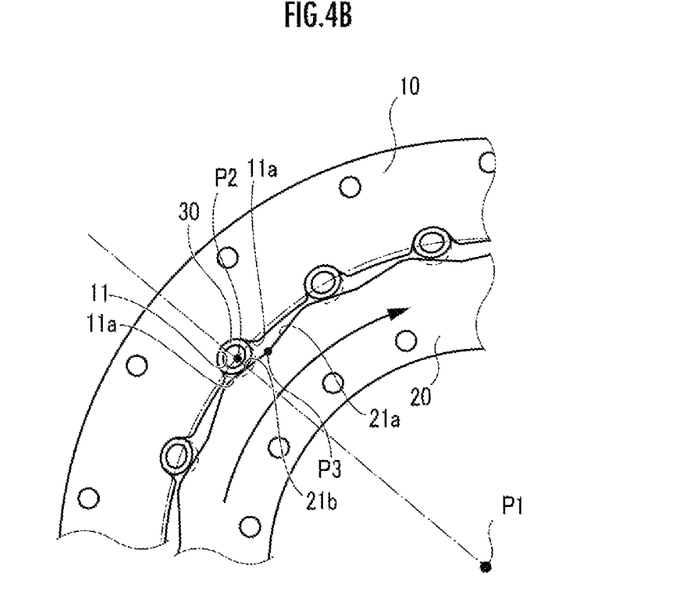

As shown in FIG. 4B, in the case where the force causing the outer peripheral member 10 and the inner peripheral member 20 to rotate relatively to each other is applied to the annular spring 1 (in the case where the inner peripheral member 20 rotates clockwise with respect to the outer peripheral member 10), each pipe spring 30 is elastically deformed as being compressed by the second cam surface 21b, whereby compressive stress is produced.

Thereafter, when the force causing the relative rotation is no longer applied to the annular spring 1, the second cam surface 21b is pressed by the elastic force of the pipe spring 30, and the relative positions of the outer peripheral member 10 and the inner peripheral member 20 return to the state (shown in FIG. 4A) before the force was applied.

In the case where a force in the opposite direction is applied (in the case where the inner peripheral member 20 rotates counterclockwise with respect to the outer peripheral member 10), the pipe spring 30 and the first cam surface 21a cause the relative rotations of the outer peripheral member 10 and the inner peripheral member 20.

According to the annular spring 1 of the present embodiment described above, the pipe spring 30 is used as the elastic member, and it is configured such that compressive stress is produced in the pipe spring 30 when the outer peripheral member 10 and the inner peripheral member 20 rotate relatively to each other.

Therefore, in the annular spring 1, even if the rigidity is lowered and the amount of displacement in the relative rotational direction of the outer peripheral member 10 and the inner peripheral member 20 is increased so as to make it easier to absorb an impact, the axial length and/or the radius can be decreased and the weight can also be reduced as compared to the conventional annular spring.

Further, the characteristics of the annular spring 1 are determined by the shape of the cam surface 21 besides the pipe spring 30. The cam surfaces 21 are formed on the outer peripheral surface of the inner peripheral member 20, so they can be easily worked. Accordingly, it is readily possible to obtain arbitrary characteristics for the annular spring 1, with a high degree of freedom in design.

Further, the space between the outer peripheral member 10 and the inner peripheral member 20 in the annular spring 1 only needs to be able to accommodate the portion of the pipe spring 30 protruding from the recess 11. It is thus possible to narrow the space as compared to the conventional annular spring. Consequently, it is possible to increase the inner diameter of the annular spring or decrease the outer diameter thereof, as compared to the conventional annular spring.

Sill further, the pipe spring 30 functions like a rolling element, and the annular spring 1 serves as a bearing as a whole. It is thus possible to suppress shifting of the relative positions of the outer peripheral member 10 and the inner peripheral member 20 (i.e. the deviation of the central axis P1). Accordingly, in the case where the annular spring 1 is used to form a mechanical device, the bearing for holding the annular spring 1 can be omitted, so it is readily possible to reduce the size and weight of the device.

While the first embodiment shown in the drawings has been described above, the present invention is not limited to the embodiment.

For example, in the first embodiment, the pipe springs 30 are used as the elastic members and they are fitted into the recesses 11 on the outer peripheral member 10. All that is needed, however, is that the elastic member has a circular cross section. The elastic member may be of a cylindrical shape or a spherical shape. Further, the elastic member may be formed integrally with the surface opposite to the surface on which the cam surface is formed.

Further, in the first embodiment, the pipe springs 30 are arranged in all the recesses 11 on the outer peripheral member 10. However, at least one recess and at least one elastic member may be provided. Alternatively, a plurality of recesses may be formed and a fewer number of elastic members may be arranged.

In the first embodiment, the pipe spring 30 is configured to be rotatable inside the recess 11. However, the elastic body does not necessarily have to be rotatably arranged. All that is needed is that it is elastically deformable as it is pressed by the cam surface.

In the first embodiment, the recesses 11 are formed on the inner peripheral surface of the outer peripheral member 10, and the cam surfaces 21 are formed on the outer peripheral surface of the inner peripheral member 20. Alternatively, the cam surfaces may be formed on the inner peripheral surface of the outer peripheral member and the recesses may be formed on the outer peripheral surface of the inner peripheral member.

Further, in the first embodiment, the central axis P2 of the pipe spring 30 is farther away from the cam surface 21 with which the pipe spring 30 comes into contact, as compared to the inner peripheral surface of the outer peripheral member 10. Alternatively, the central axis of the elastic member may be on the extension of the inner or outer peripheral surface on which the recess into which the elastic member is fitted is formed, or it may be closer to the cam surface as compared to the inner or outer peripheral surface.

Further, in the first embodiment, the cam surface 21 is made up of the first cam surface 21a and the second cam surface 2 lb formed in line symmetry with the first cam surface 21a. These cam surfaces, however, do not necessarily have to be line symmetrical. All that is needed is that the cam surface is shaped so as to implement the required characteristics of the annular spring. The cam surface may be straight, or it may be curved or stepped.

In the above embodiment, the cross roller bearing 40 is arranged as the rolling element between the outer peripheral member 10 and the inner peripheral member 20. This is for the purpose of utilizing the high rigidity of the cross roller bearing. However, the rolling element does not necessarily have to be arranged. Even when the rolling element is arranged, it does not necessarily have to be the cross roller bearing; another bearing such as a ball bearing may be used.

Second Embodiment

A robot joint mechanism using the annular spring of the first embodiment will now be described as a second embodiment of the present invention. The robot joint mechanism of the present embodiment is used, for example, for the robot as follows.

Figure 5:
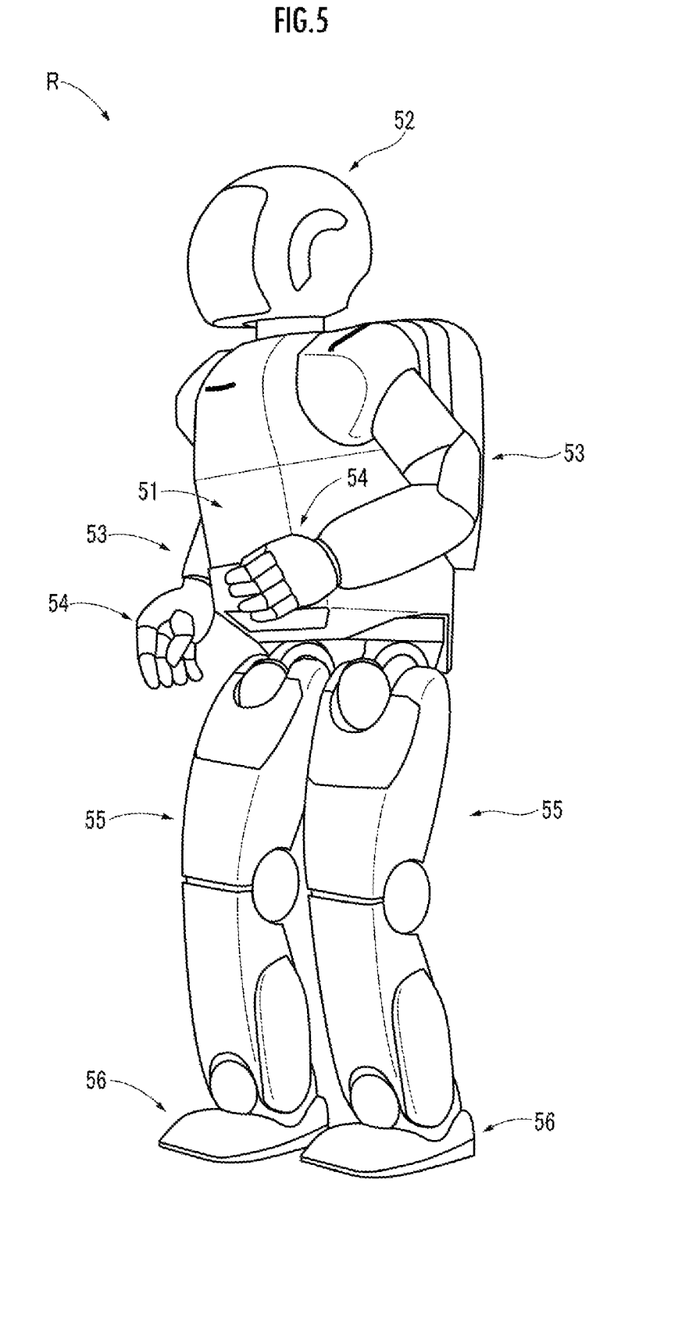
FIG. 5 is a schematic diagram showing the configuration of a robot including a robot joint mechanism according to a second embodiment of the present invention.

As shown in FIG. 5, the robot R includes, similarly to a human being, a body 51 corresponding to a torso, a head 52 disposed on top of the body 51, right and left arms 53 extended from respective sides of the upper portion of the body 51, a hand 54 provided at the tip end of each arm 53, right and left legs 55 extended downward from the lower portion of the body 51, and a foot 56 attached to the tip end of each leg 55.

The robot R is configured to be able to bend and stretch the arms and legs at joint mechanisms which correspond to the human shoulder joints, elbow joints, wrist joints, hip joints, knee joints, and ankle joints.

Figure 6:
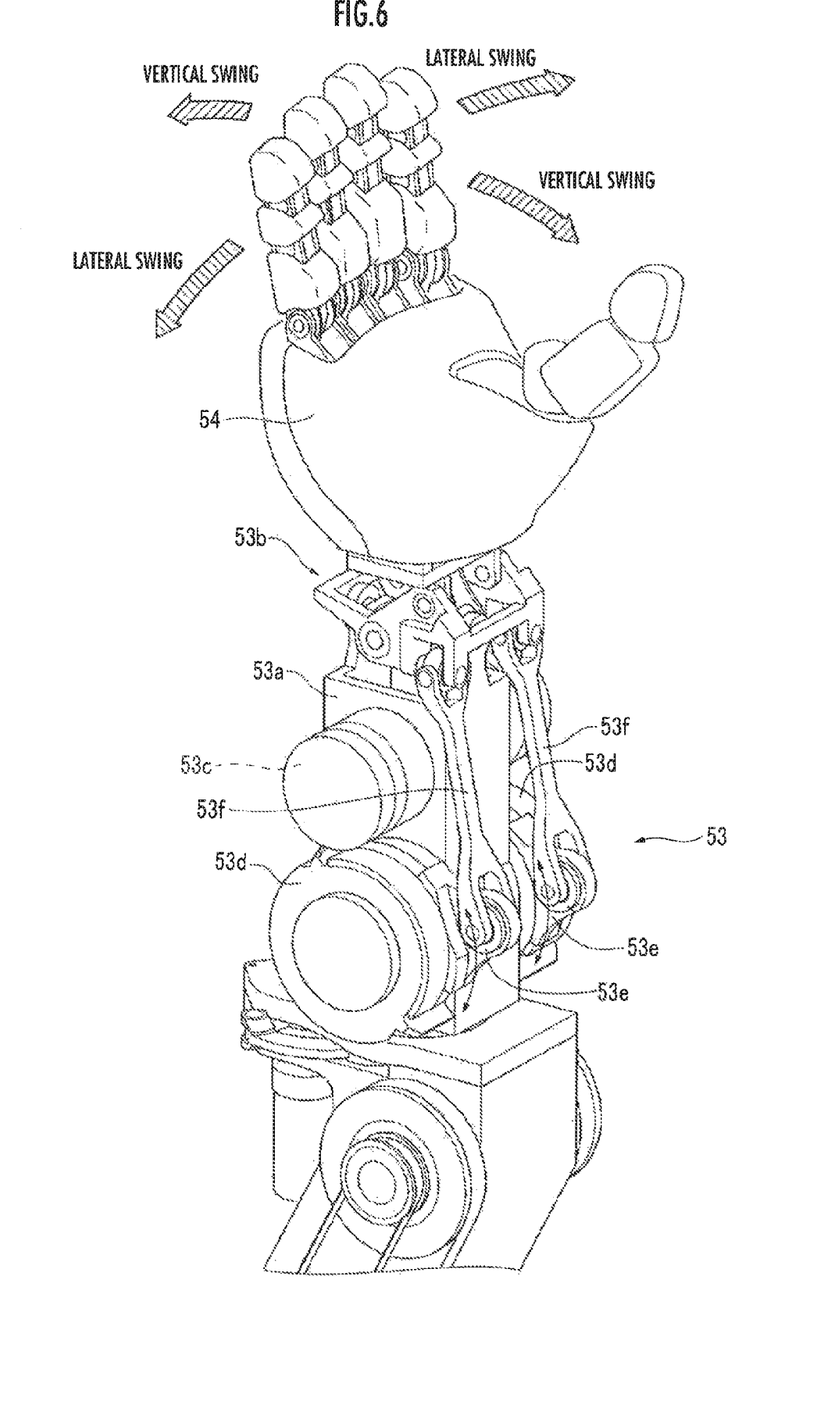
FIG. 6 is a perspective view showing the configuration of a joint mechanism built in an arm of the robot in FIG. 5.

As shown in FIG. 6, the joint mechanism built in an arm 53 of the robot R includes: a base link 53a serving as a body of the forearm of the arm 53; a link mechanism 53b arranged between the base link 53a and the hand 54 to allow lateral or vertical swing of the hand 54; an actuator 53c (driving source) arranged inside the base link 53a; a pair of right and left wave gear devices 53d arranged inside the base link 53a to decelerate a driving force from the actuator 53c and transmit the resultant force; driving arms 53e extending from the respective wave gear devices 53d; and a pair of connecting rods 53f connected to the respective driving arms 53e and to the link mechanism 53b.

With the joint mechanism configured as described above, the hand 54 of the robot R is caused to swing vertically in the case where the pair of right and left connecting rods 53f are moved in the same direction along the longitudinal direction of the base link 53a, while it is caused to swing laterally in the case where the connecting rods 53f are moved in the relatively opposite directions.

The wave gear device 53d has a circular spline having teeth formed on its inner peripheral surface, and a flex spline having teeth formed on its outer peripheral surface to be engaged with the teeth of the circular spline. The teeth of the circular spline are provided on the inner peripheral surface of the inner peripheral member of the annular spring shown in the above embodiment. Further, the driving arm 53e extending from the wave gear device 53d is connected to the outer peripheral member of the annular spring shown in the above embodiment.

Therefore, the driving force transmitted from the actuator 53c to the wave gear device 53d is then transmitted to the driving arm 53e via the annular spring, thereby moving the connecting rod 53f.

The joint mechanism configured as described above is reduced in size and weight as compared to the robot joint mechanism using the conventional annular spring. Further, in the case where the arm 53 or the hand 54 collides with an obstacle or the like, the annular spring absorbs the impact of the collision.

Further, in this joint mechanism, the annular spring serves as the bearing, so there is no bearing for holding the annular spring. This eliminates the need to secure the space for arranging the bearing in the joint mechanism, resulting in reduction in size and weight as compared to the conventional joint mechanism.

While the second embodiment shown in the drawings has been described, the present invention is not limited to the embodiment. For example, the speed reduction mechanism may be connected to the outer peripheral member of the annular spring, instead of the inner peripheral member thereof Further, in the second embodiment, a combination of the annular spring and the wave gear device was described. The present invention however is not limited to this configuration. For example, a planetary gear mechanism or other speed reduction mechanism may be used instead of the wave gear device.

Description of Reference Numerals

1: annular spring; 10: outer peripheral member; 11: recess; 11a: edge; 12: outer peripheral side bearing groove; 20: inner peripheral member; 21: cam surface; 21a: first cam surface; 21b: second cam surface; 22: inner peripheral side bearing groove; 30: pipe spring (elastic member); 40: cross roller bearing (rolling element); 51: body; 52: head; 53: arm; 53a: base link; 53b: link mechanism; 53c: actuator (driving source); 53d: wave gear device; 53e: driving arm; 53f: connecting rod; 54: hand; 55: leg; 56: foot; P1: central point (central axis) of outer peripheral member 10; P2: central axis of pipe spring 30; P3: contact point between pipe spring 30 and outer peripheral surface of inner peripheral member 20 in the state where no load is applied; and R: robot.

What is claimed is:

1. An annular spring comprising an annular outer peripheral member, an annular inner peripheral member arranged concentrically with the outer peripheral member on an inner peripheral side of the outer peripheral member and rotatable relatively to the outer peripheral member, and an elastic member arranged between the outer peripheral member and the inner peripheral member, wherein the elastic member is composed of an elastic body having a circular cross section, one of an inner peripheral surface of the outer peripheral member and an outer peripheral surface of the inner peripheral member has formed thereon a recess to which the elastic member is fitted, the other of the inner peripheral surface and the outer peripheral surface has formed thereon a cam surface against which the elastic member abuts, and the cam surface is formed in such a way as to protrude in a radial direction as it is farther away in a circumferential direction of the outer peripheral member or the inner peripheral member from a point of contact with the elastic member in a state where the outer peripheral member and the inner peripheral member are not rotating relatively to each other.

2. The annular spring according to claim 1, further comprising a rolling element between the outer peripheral surface and the inner peripheral surface.

3. The annular spring according to claim 1, wherein the elastic member is rotatable inside the recess in which the elastic member is fitted.

4. The annular spring according to claim 1, wherein the elastic member fitted in the recess has a central axis which becomes farther away from the cam surface as compared to the inner peripheral surface or the outer peripheral surface on which the recess is formed.

5. The annular spring according to claim 1, wherein the recess has edges chamfered into an arc shape.

6. A robot joint mechanism comprising the annular spring according to claim 1, a driving source, and a speed reduction mechanism configured to decelerate a driving force from the driving source and transmit the resultant force to the outer peripheral member or the inner peripheral member of the annular spring.

7. The robot joint mechanism according to claim 6, wherein the speed reduction mechanism is a wave gear device including a circular spline having teeth formed on an inner peripheral surface and a flex spline having teeth, to be engaged with the teeth of the circular spline, formed on an outer peripheral surface, and the teeth of the circular spline are arranged on the inner peripheral member of the annular spring.

* * * * *